(12) United States Patent
Blender et al.

(10) Patent No.: US 11,494,548 B1
(45) Date of Patent: Nov. 8, 2022

(54) MULTILAYERED ELECTRONIC CONTENT MANAGEMENT SYSTEM

(71) Applicant: Wells Fargo Bank, N.A., San Francisco, CA (US)

(72) Inventors: Zachary Blender, San Francisco, CA (US); Himanshu Baral, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/199,073

(22) Filed: Mar. 11, 2021

Related U.S. Application Data

(63) Continuation of application No. 15/288,318, filed on Oct. 7, 2016, now Pat. No. 10,963,625.

(51) Int. Cl.
   *G06F 40/166* (2020.01)
   *G06F 16/93* (2019.01)
   *G06F 9/54* (2006.01)

(52) U.S. Cl.
   CPC .......... *G06F 40/166* (2020.01); *G06F 9/542* (2013.01); *G06F 16/93* (2019.01)

(58) Field of Classification Search
   CPC ......... G06F 40/166; G06F 9/542; G06F 16/93
   See application file for complete search history.

(56) References Cited

U.S. PATENT DOCUMENTS

| | | | |
|---|---|---|---|
| 5,920,861 A | 7/1999 | Hall et al. | |
| 6,088,707 A | 7/2000 | Bates et al. | |
| 7,882,565 B2 | 2/2011 | Collins et al. | |
| 7,930,316 B2 | 4/2011 | Muller et al. | |
| 8,122,367 B2 | 2/2012 | Krieger et al. | |
| 8,265,942 B2 | 9/2012 | Doyle et al. | |
| 8,286,071 B1 | 10/2012 | Zimmerman et al. | |
| 8,417,666 B2 | 4/2013 | Bailor et al. | |
| 8,612,380 B2 | 12/2013 | Kleppner et al. | |
| 8,612,469 B2 | 12/2013 | Neff et al. | |
| 8,925,108 B2 | 12/2014 | Herbach et al. | |
| 9,251,114 B1 | 2/2016 | Ancin et al. | |
| 9,912,752 B1* | 3/2018 | Davis | G06F 16/2365 |
| 2002/0007383 A1* | 1/2002 | Yoden | G06F 40/143 715/205 |
| 2002/0095432 A1* | 7/2002 | Shimomura | G06F 21/6218 |
| 2005/0114129 A1 | 5/2005 | Watson et al. | |

(Continued)

*Primary Examiner* — Keith D Bloomquist
(74) *Attorney, Agent, or Firm* — Kilpatrick Townsend & Stockton LLP

(57) ABSTRACT

Multilayer electronic content management is provided. A method includes determining a first section and a second section of a document for dynamic content management. The method also includes determining a first trigger event that prompts the dynamic content management on the first section and a second trigger event the prompts the dynamic content management on the second section. The method also includes implementing a first action to the first section based on an occurrence of the first trigger and a first rule, and a second action to the second section based on another occurrence of the second trigger and a second rule. The implementation may include executing a first micro-service within a metadata layer of the electronic document for implementation of the first action and executing a second micro-service within the metadata layer for implementation of the second action.

20 Claims, 10 Drawing Sheets

(56) References Cited

U.S. PATENT DOCUMENTS

| | | |
|---|---|---|
| 2005/0154701 A1 | 7/2005 | Parunak et al. |
| 2006/0072721 A1 | 4/2006 | Wisniewski et al. |
| 2006/0101051 A1* | 5/2006 | Carr ................ G06F 40/174 |
| 2007/0088715 A1* | 4/2007 | Slackman ............ G06Q 10/10 |
| 2007/0220115 A1 | 9/2007 | Srinivasan et al. |
| 2007/0220428 A1 | 9/2007 | Kureshy et al. |
| 2007/0260580 A1 | 11/2007 | Omoigui |
| 2008/0320600 A1 | 12/2008 | Pandiscia et al. |
| 2009/0006949 A1* | 1/2009 | Takeuchi ............. G06F 21/10 715/255 |
| 2009/0254510 A1 | 10/2009 | Omoigui |
| 2010/0070300 A1 | 3/2010 | Anderson et al. |
| 2010/0107049 A1 | 4/2010 | Marston |
| 2010/0299437 A1 | 11/2010 | Moore |
| 2012/0185369 A1 | 7/2012 | Sinha et al. |
| 2012/0254134 A1 | 10/2012 | Talati et al. |
| 2013/0191781 A1 | 7/2013 | Radakovitz et al. |
| 2013/0198647 A1 | 8/2013 | Claux et al. |
| 2014/0013203 A1* | 1/2014 | Rogoveanu .......... G06F 40/166 715/234 |
| 2014/0013242 A1 | 1/2014 | Beresford-Wood et al. |
| 2014/0214759 A1 | 7/2014 | Williams et al. |
| 2014/0281875 A1 | 9/2014 | Branton et al. |
| 2014/0281880 A1 | 9/2014 | Sachs et al. |
| 2014/0297535 A1 | 10/2014 | Pinsker et al. |
| 2014/0351266 A1 | 11/2014 | Musgrove |
| 2014/0372370 A1 | 12/2014 | Massand |
| 2015/0160817 A1 | 6/2015 | Hwang et al. |
| 2016/0132252 A1 | 5/2016 | Bish et al. |
| 2016/0314102 A1 | 10/2016 | Bezar et al. |
| 2016/0344737 A1 | 11/2016 | Anton et al. |
| 2017/0017678 A1 | 1/2017 | Agrwal et al. |
| 2017/0063833 A1 | 3/2017 | Colle et al. |
| 2017/0160880 A1 | 6/2017 | Jose et al. |
| 2017/0230349 A1* | 8/2017 | Gaur .................. G06F 21/57 |
| 2017/0310716 A1 | 10/2017 | Lopez Venegas et al. |
| 2018/0026984 A1 | 1/2018 | Maker et al. |
| 2018/0032997 A1 | 2/2018 | Gordon et al. |
| 2018/0034778 A1 | 2/2018 | Ahuja et al. |
| 2018/0113940 A1* | 4/2018 | Mora Lopez ........... G06F 9/46 |

* cited by examiner

MULTILAYERED ELECTRONIC CONTENT MANAGEMENT SYSTEM

This application is a continuation of U.S. patent application Ser. No. 15/288,318, filed Oct. 7, 2016, and entitled "MULTILAYERED ELECTRONIC CONTENT MANAGEMENT SYSTEM," the entirety of which is incorporated herein by reference.

BACKGROUND

Traditionally, secretaries or administrative assistants would perform the bulk of administrative work involving documents and file management. However, with the widespread use of computers and the internet, the bulk of this work is now being performed as the document is being created, without relying on a secretary or administrative assistant. Although it is possible to efficiently create electronic documents, management of the documents may become burdensome, decrease efficiency, and the value of one's time may outweigh the management chore. Further, resistance or lack of time to keep content up to date may result in files that are outdated, obsolete, or useless.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to multilayered electronic content management. One aspect concerns a system comprising a processor coupled to a memory that stores instructions that, when executed by the processor, cause the processor to invoke a service within a generated electronic document to acquire data from outside the document, evaluate a condition of a content retention rule associated with a section of the document based on the data outside the document, and remove the section of the document when the condition is satisfied in accordance with the rule. The instructions can further cause the processor to replace the removed section of the document with a new section of the document, which in one scenario can be a section update. Further, the instructions can cause the processor to evaluate a security condition of a security rule associated with a second section of the document and trigger an action based on the security rule when the security condition is satisfied. For example, the action can be to remove at least a portion of the second section of the document when the security condition is satisfied. Alternatively, the action can be to encrypt at least a portion of the second section of the document when the security condition is satisfied. In one instance, the data outside the document comprises a current time and the condition of the content retention rule includes one or more predetermined times. In another instance, the data outside the document is current location and the condition of the content retention rule is one or more predefined geographic locations.

Another aspect pertains to a method comprising invoking a service within a generated electronic document to acquire data from outside the document, evaluating a condition of a content retention rule associated with a section of the document based on the data outside the document, and removing the section of the document when the condition is satisfied in accordance with the rule. The method can comprise replacing the removed section of the document with a new section of the document or an updated section. The method can further comprise evaluating a security condition of a security rule associated with a second section of the document and initiating an action based on the security rule when the security condition is satisfied. Removal can be initiated of at least a portion of the second section of the document when the security condition is satisfied or encryption of the at least a portion of the second section can be initiated when the security condition is satisfied. Furthermore, the method can comprise invoking the service to acquire a time or location as the data outside the document.

In accordance with another aspect a computer-readable storage medium is disclosed that stores instructions that, when executed by a processor, cause the processor to perform operations comprising activating a service included within an electronic document to acquire data from outside the document, assessing a condition of a content retention rule associated with a section of the documented based on the data outside the document, and removing the section of the document when the condition is satisfied in accordance with the rule. The operations further comprise replacing the removed section of the document with a new section of the document. Furthermore, the operations can comprise acquiring at least one of a current time or geographic location from outside the document. Further yet, operations can comprise detecting an unauthorized attempt to access the electronic document and triggering an action based on a security rule associated with at least one section of the document in response to the unauthorized attempt.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
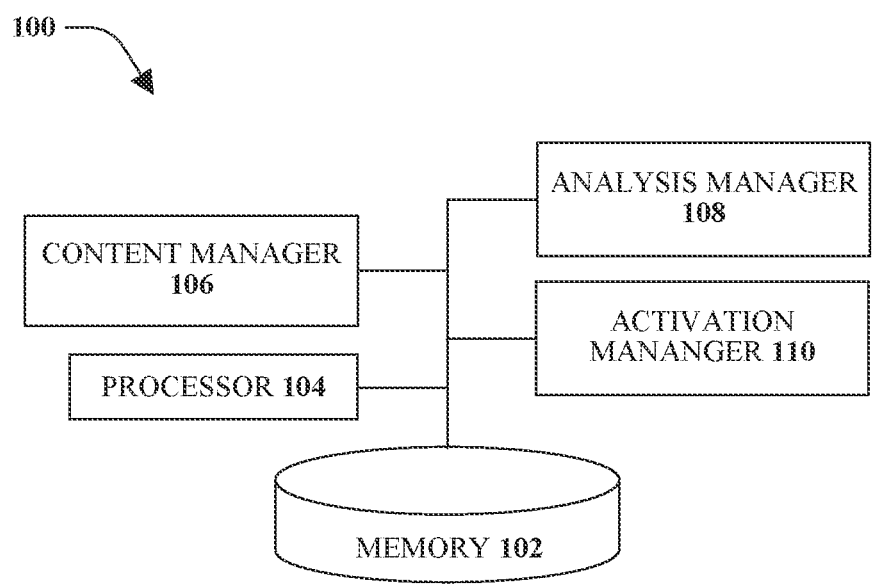
FIG. 1 illustrates an example, non-limiting system configured to provide multilayered electronic content management, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to an electronic content management system. According to an implementation, content management or retention functionality is provided such that content may be automatically deleted, replaced, updated, revised, and so on, based upon the occurrence of an event or the occurrence of two or more events. As utilized herein an event may be the passage of time as represented by a date certain (e.g., a defined time, a defined date, a specified number of minutes, hours, days, and so on). In some implementations, an event may be an action that has occurred (e.g., a person has been hired at a company, a new set of legal regulations has been enacted, a document has been printed a defined number of times, a document is being access within (or outside of) a defined geographic region, and so forth).

At about the same time as a document is created and/or at a different time based on modification of the document, one or more sections of the document may be identified. A section may be one or more of a word, a phrase, a sentence, a paragraph, a number, an equation, a picture, a graph, a video, and so on. In some implementations, a section may include an entire document. In other implementations, a section may include related sections of two or more documents (e.g., the two or more documents are cross-referenced).

Further, one or more rules and/or policies may be defined for each of the sections. According to some implementations, a rule/policy may apply to more than one section. Alternatively, or additionally, multiple rules/policies may apply to a section, or one or more subsections, where a subsection is a portion of a section. For example, a first rule may apply to the section and a second rule may apply to a subsection. Thus, if the first rule is satisfied the section (including the subsection) may be updated as determined by the first rule. If the second rule is satisfied the subsection (but not the remaining portions of the section) may be updated as determined by the second rule.

Based on the identification and the rule/policy associated with the respective section, one or more actions may be implemented based on an occurrence of a trigger event or multiple trigger events. In one example, a sensitive section of a document may be removed, scrambled, or encrypted when the trigger event indicates an unauthorized user is attempting to access the document. In another example, the trigger event is a set date and if a section of the document was only relevant until that date, that section is removed (e.g., removes itself) from the document. For example, if the section is only relevant until the end of 2016, on Jan. 1, 2017, that section is removed from the document.

Accordingly, documents may be managed dynamically based on trigger events and rules associated with the document or sections of the documents. In this manner, efficiencies related to management of documents may be realized and the need for manual content management may be mitigated.

FIG. 1 illustrates an example, non-limiting system 100 configured to provide multilayered electronic content management, according to an aspect. A large amount of time is spent on documents (e.g., electronic documents), including time for creation, review, and management as one task. A user first creates the document, then reviews the document for issues, then decides where to save the document and how it should be organized in relationship to other files (or other documents) so that the placement of the document makes logical sense and the document may easily be found. Time may also be spent by the user to add any metadata, determine security properties, audit, determine to whom the document should be routed for approval, and so on.

This paradigm makes sense intuitively because to the user it does not seem as if a lot of time is spent on the non-creation factor and/or the review factors. However, if the amount of time spent on the non-creation or management factors, (including security, general metadata, workflow, audit, retention, and organization) is multiplied by the number of employees at a large enterprise, or across the globe, it is a large amount of time.

It may often be the case that high-paid subject matter experts are the ones spending their time on the non-creation factors when these functions could actually be automated with technology tools. The various aspects discussed herein attempt to isolate the different aspects of documents into different layers so that the most valuable employees may focus purely on document creation or review rather than the other factors. Further, the various aspects discussed herein automatically perform one or more functions based on the occurrence of one or more trigger events.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be a content manager 106 that may be configured to identify document content, referred to as a "section". As utilized herein, "content" refers to the perceivable portions of the document. For example, the content (e.g., the section) may be words, sentences, paragraphs, formatting, numbers, equations, pictures, and so on. The identification of the document content may be performed automatically by the content manager 106. For example, the content manager 106 may be configured to identify words and/or phrases that may be subject to automatic action as discussed herein. According to some implementations, the content manager 106 may receive information related to identification of one or more sections of the content. For example, a sentence may be identified and the identification of the section may be received by the content manager 106. The information related to the sections may be received from a user based on manual identification of the section(s) by the user.

The content manager 106 may be configured to assign a unique identification to each section of the document. In addition, a section may be divided into subsections, according to some implementations. Further, each section (and each subsection) may be assigned respective unique identifications. In some implementations, a section, at least in part, may be included in another section. The identification of the section and the associated unique identification may be retained as metadata, which is data that provides information about other data.

The system 100 may also include an analysis manager 108 that may be configured to obtain information related to a trigger event that causes an action to be performed related to one or more identified sections of the document. The trigger event may be obtained by the analysis manager 108 from an external source (e.g., external to the system 100 and/or the document) and/or from an internal source (e.g., internal to the system 100 and/or the document).

For example, if the event is a certain date (e.g., Dec. 31, 2016), the action to be performed may be to remove a section of the document (e.g., a paragraph), insert a section, modify a section, and so on. In another example, if the event is a location where the document is being opened, the action may be to change information relevant to that location and/or dynamically prevent (or allow) access to the document or sections thereof. For example, if the document is related to a national company, portions of the document related to a local branch of the national company may be automatically updated based on where the document is being accessed. For example, if the document is opened in Maine, the address, phone number, and other contact information for the Augusta, Me., office might be presented. However, if the same document is opened in Oregon, the contact information for Salem, Oreg., might be presented. This may occur even if the same person opened the document in the two different locations, unless a rule and/or policy has been established to the contrary.

The system 100 may also include an activation manager 110 that may be configured to dynamically implement one or more actions based on an occurrence of the trigger event. According to some implementations, the trigger event may be a certain date and/or time (e.g., Oct. 14, 2020, next Thursday at 11:59 p.m., and so forth). In other implementations, the trigger event may be an action (e.g., an unauthorized person is attempting to access the document, a number of times the document has been printed satisfies a threshold value, a change in a law and/or regulation has occurred, the document is being accessed at a certain location, and so on). The implementation by the activation manager 110 may be performed on the section based on a correlation between the unique identification, the trigger event, and the rule.

It is noted that although the various aspects may be illustrated and described with respect to a single section (or subsection) of a document, the disclosed aspects are not limited to this implementation. Instead, multiple sections and/or subsections of the document may be identified and each section and/or subsection may have a different trigger and/or a different rule than the other sections and/or subsections of the document.

In some implementations, a trigger event may cause implementation of more than one rule on more than one section and/or subsections of the document. For example, a first trigger may be a certain date (e.g., Apr. 19, 2017) because, a CEO of a major corporation, Mrs. G, is stepping down and another CEO, Mrs. H, is taking her place. A second trigger may be that a third-party regulation (first regulation) is in effect only until Apr. 19, 2017, thereafter, another regulation (second regulation) will be in effect. The information related to the CEO is located in a first portion (or section) of the document and the information related to the third-party regulation is located in a second portion of the document. Therefore, on Apr. 20, 2017, when the document is accessed, the information related to Mrs. H is provided in a first portion of the document (e.g., the information for Mrs. G has been automatically removed. Also on Apr. 20, 2017, when the document is accessed, the information in the second portion is automatically updated to include the second regulation. Thus, a single trigger event caused a change to two different sections of the document.

Accordingly, a document may be self-aware and may act upon trigger events in an automatic and efficient manner. This reduces the need for manual monitoring of the document. Further, this increases efficiency of a device on which the system is located (e.g., a computer) since documents are updated and retained in an on-going basis. Thus, the information in a document is not stale or out of date and users are more likely to use the document, rather than another source of information.

Figure 2:
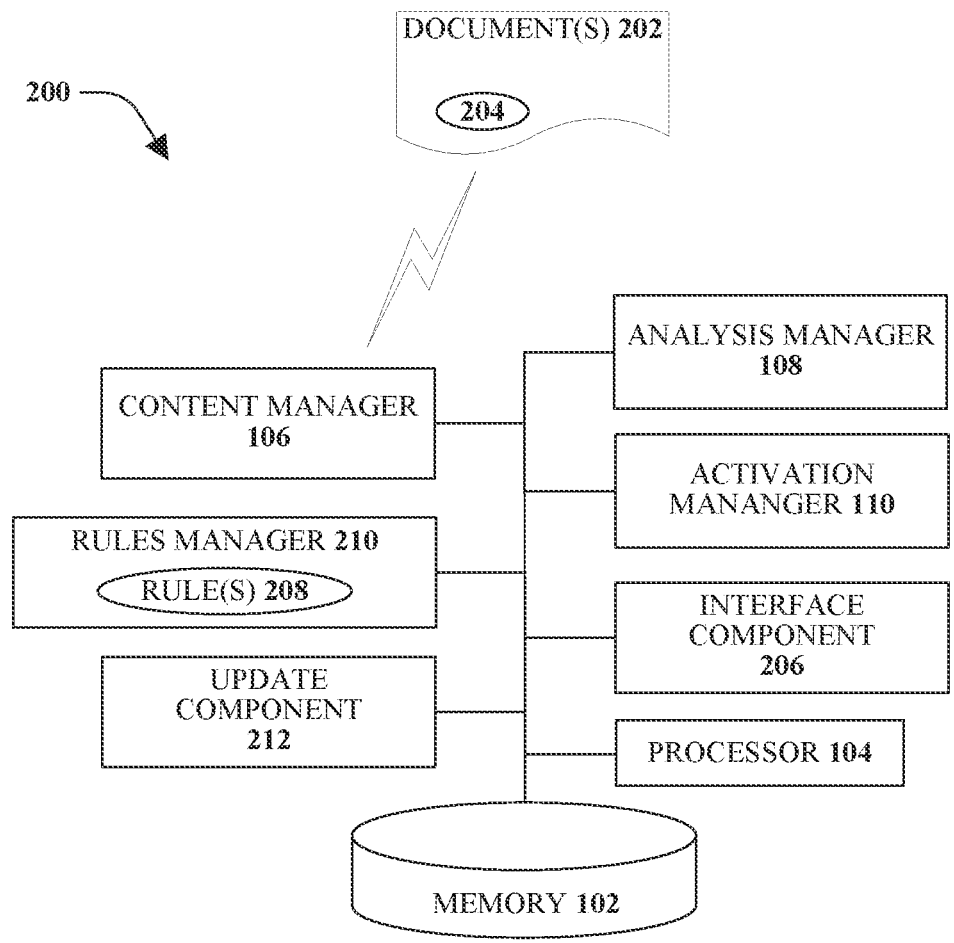
FIG. 2 illustrates an example, non-limiting system configured to provide content retention and security functionality, according to an aspect.

FIG. 2 illustrates an example, non-limiting system 200 configured to provide content retention and security functionality, according to an aspect. In accordance with an aspect, content retention functionality may be provided such that content may be automatically deleted, replaced, updated, and/or revised after a predetermined trigger event (e.g., time, location, action, event, and so forth). In an additional or alternative aspect, security functionality may be provided that defines automatic time-based, content-based, and/or role-based access and content may be automatically deleted, replaced, updated, and/or revised based on the security.

As illustrated the content manager 106 may be configured to interact with a document 202. It is noted that although the term "document" is utilized for purposes of simplicity, the term "document" may refer to any type of electronic media content that may be utilized in electronic format and/or in print format. Further, although the various aspects will be discussed with respect to a single document 202, the various aspects may be utilized with more than one document, or a set of documents.

Each document 202 in the set of documents may be of a same type or subsets of the documents may be of different types. For example, a first document may be a word processing document, a second document may be a spreadsheet document, a third document may be a slide show presentation, and so on. In another example, two or more documents may be word processing documents, another two or more documents may be spreadsheet documents, two or more documents may be slide show presentations, and so on.

When a document 202 is created, a section 204 of the document 202 may be tagged to indicate the section 204 may be subject to dynamic content management. Although discussed with respect to a single section 204, the disclosed aspects may be utilized with more than one section. Alternatively or additionally, the section(s) may be flagged or marked after the document is created, such as during an editing stage. Further, according to some implementations, a section of the document may have different flags associated with the entire section or associated with subsections thereof.

For example, when the document is created and/or edited, a user may indicate that a section of the document is subject to a rule and/or policy. The section identified may be a sensitive section of the document (e.g., includes confidential information, includes personal information, and so forth). In another example, the section may be obsolete after a certain period of time, or at a date certain. In a further example, the section of the document (or the entire document) may be geographically restricted (e.g., should not be accessed outside of the United States, should not be accessed outside the European Union, should not be accessed within Germany, and so forth). Additional reasons for flagging sections of the document(s) may be utilized and are too numerous to discuss herein but may be utilized with the disclosed aspects.

To select the section 204 of the document 202, a user may manually select the portion. For example, in a word processing document, the user may highlight a sentence or paragraph. In a word processing spreadsheet example, the user may manually select one field or multiple fields, where the multiple fields represent a single portion. Other manners of selection may also be utilized by the user to indicate the section(s) and associated rule(s).

According to an additional or alternative implementation, the section 204 may be selected automatically based on various document content rules and/or document content policies. For example, a document content policy may indicate that any time a government regulation is referenced, the section of the document related to that regulation is automatically identified. In another example, a document content policy may be that when a contact at the organization (e.g., the source of the document) is referenced, the contact and related contact information is identified (e.g., if the person leaves the organization, the replacement's information may be automatically used instead).

A user may interact with the system 100 through an interface component 206. According to some implementations, the interface component 206 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (VGA)) with limited graphic support, and/or low bandwidth communication channels.

At substantially the same time as the section 204 is identified (or at a different time), at least one rule 208 may be associated with the policy by a rules manager 210. The rule(s) 208 may be expressed in various formats including, for example, "if/then" statements. Example, non-limiting if/then statements may include:

If unapproved user accesses document, then remove an identified sensitive section of the document.

If a set date has occurred, update section of document to reflect a change in a legal or regulatory rule.

If a set date has occurred, remove a section of the document.

If the document has been opened x number of times, include on the printed document an indication of the number of times the document was opened.

Based on detection of the occurrence of the "if" portion of the statement, the rules manager 210 may be configured to automatically (or dynamically) implement the "then" portion of the rule. For example, if it is determined that an unapproved user is accessing the document, then the rules manager 210 (or other system component) deletes the identified section before allowing the unapproved user to access the document. Accordingly, when the unapproved user views the document, the identified section is not perceivable by the unapproved user.

Further, the rules manager 210 may be configured to validate the one or more rules. For example, if the rule specifies the date "February 30," the rules manager 210 may output an error message or another alert (e.g., through the interface component 206) to indicate there is no such date as February 30. In another example, if the rule specifies the document is to be geographically restricted and a device through which a document is attempting to be accessed does not have location capabilities, access to the document may be restricted, even if that document would otherwise be accessible (if the device was able to provide location information).

The system 200 may also include an update component 212 that may be configured to dynamically update one or more rules based upon predefined criteria and/or a third party source. For example, if the rule relates to a regulation that changes periodically, at about substantially the same time as the document is changed a first time, the update component 212 may update the rule to check for a next change to the regulation.

Figure 3:
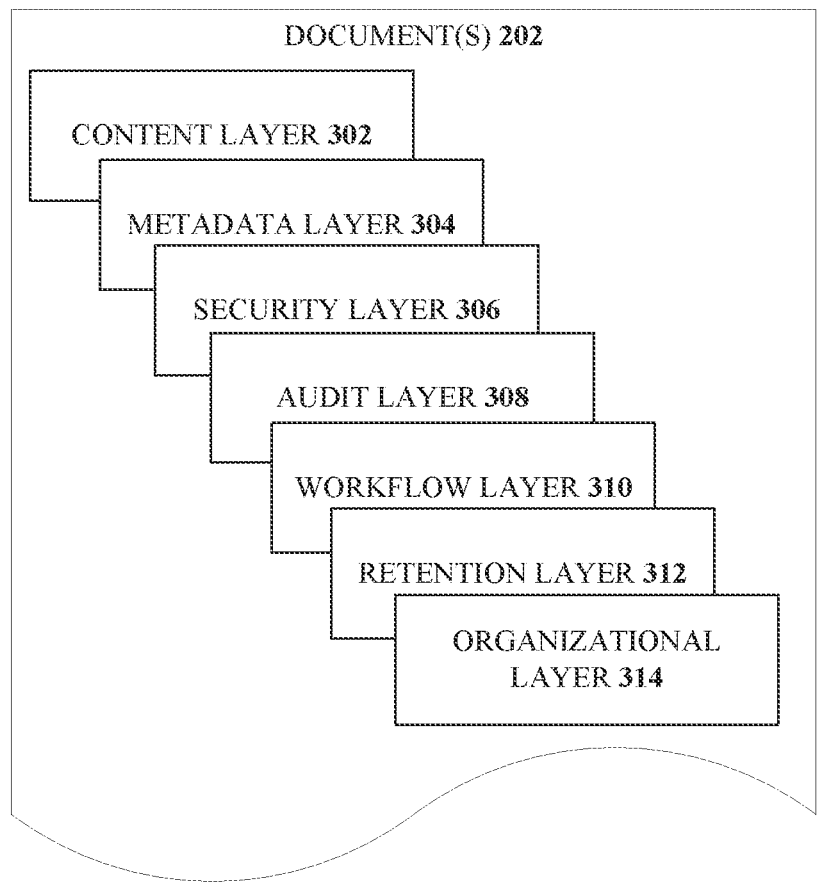
FIG. 3 illustrates an example, non-limiting illustration of document layers, according to an aspect.

FIG. 3 illustrates an example, non-limiting illustration of document layers, according to an aspect. As previously discussed, the document 202 may be any type of document that is capable of being produced in electronic format and may be reduced to printed format as desired. Each layer of the document layers may be stored independently and may be applied to an entire document, or to one or more portions of the document. The layers interact to manage the document and are utilized to explain how the various aspects of the document are executed.

The document 202 may be a smart document that is self-aware and may act upon sections of the document based on various situations, as discussed herein. As utilized herein "self-aware" indicates that the document has knowledge of its content and data, including the content and data retained in all layers of the document. The smart document may execute a set of services (e.g., micro services) in order to perform actions that may be needed to comply with rules that are activated based on one or more trigger events. The smart document is self-contained, self-managed, and includes self-healing aspects.

As illustrated, the document 202 may include a content layer 302, which includes the perceivable items of the document 202. Also included may be a metadata layer 304 that may be configured to retain information related to the document. The metadata layer 304 may also include information related to micro services, which will be discussed in further detail below.

A security layer 306 may be included in the document 202, which may be configured to associate one or more security criteria to the entire document 202 and/or to sections of the document. An audit layer 308 may be configured to track edits and perform version comparison. A workflow layer 310 may be configured to track changes to the document as well as how the document moves through an organization or other defined structure. A retention layer 312 may be configured to store one or more edits to the document. An organizational layer 314 may be configured to retain information related to different sections of the document.

As mentioned, each layer may be stored independently, which allows for the application of analytics across layers in order to find trends and patterns to suggest a structure or baseline for a given layer.

Figure 4:
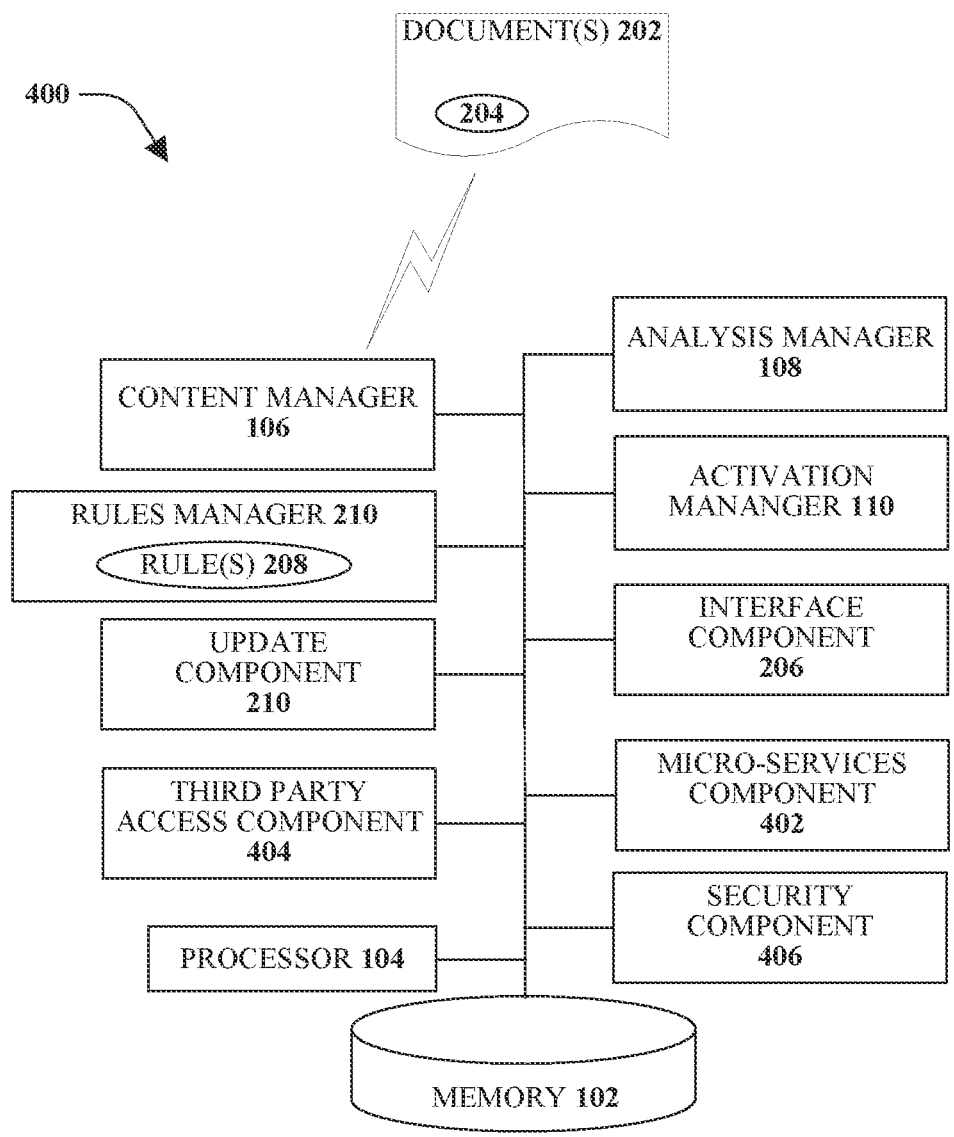
FIG. 4 illustrates an example, non-limiting system for content retention functionality, according to an aspect.

FIG. 4 illustrates an example, non-limiting system 400 for content retention functionality, according to an aspect. The document may include supporting functions, implemented by a micro-services component 402 that may be configured to implement one or more micro-services. Examples of micro-services may include determining a current time, determining a current location, determining a user's authorization level, and so on.

The micro-services component 402 may be configured with a set of functions and/or a set of services that support one or more micro-services. According to an implementation, the micro-services component 402 may be configured to access key elements of the data that may be stored within the document, or at a location remote from the document. For example, the key elements of the data may be stored as metadata. In another example, the key elements may be stored in an auxiliary document, which may be encrypted to provide a level of security.

In some implementations the key elements are saved as micro services, which may be a combination of some data deemed within the document itself and some data that is outside of the document. The data stored outside the document may be stored in a data repository that may be called on by the micro-services component 402. The data may provide information related to how to update the document and/or how to modify the document, for example.

As an example, the micro-services component 402 (or another component, such as the activation manager 110) may be configured to remove an especially sensitive section of a document (or scramble or encrypt a sensitive section of a document) when a trigger has been identified that someone is trying to access that document.

In another example, after a set date, a set of data that was caveated to a temporary period of time may be removed from the document. For example, if that section of the document was only relevant until end of 2016, on Jan. 1, 2017 that part of the document will remove itself (e.g., through the execution of one or more micro-services).

In yet another example, log information that is typically stored in the metadata may be utilized to update the document itself. For example: show the number of times document was read. In another example, information related to other log information may be provided based upon a rule and/or policy.

In another example, a rule may be that the document should not leave the United States or the European Union. Thus, the document may periodically (e.g., every 5 minutes, or based on another time frame), invoke the micro-services component 402, which may determine the location where the document is being accessed. If the document goes from a first person in the United States to a second person in the Ukraine, the micro-services component 402 may encrypt the key elements of the document or may destroy the document.

A document may have different types of micro-services, including generic services. Generic services determine generic information, such as the time, location, authorization, and so on. Detailed services may relate to information that is based on the document itself (e.g., expiration of a section of the document).

According to some implementations, a third-party access component 404 may be configured to obtain information from a third-party source. For example, after a set date, a document may update itself based on a third-party table to reflect a change in a legal statue or regulatory code or other rule that is published at a third-party location.

In accordance with an example, after a set date, the rule may indicate to remove a set of data that is only relevant for a limited time period. Thus, the rule indicates that after this date this section no longer applies. Accordingly, an event listener (e.g., the micro-services component 402) may be included in the document that reviews the date passively in the background and when the date passes it may automatically remove the section that has been flagged. Thereafter, when the document is opened, that section is no longer there (after the date).

Behind the scenes, the listener (e.g., micro-service on the document) is checking the date, no matter where the document is located. If stored on a computer or connected to the internet, it determines the date. When the date has passed, in the metadata, there is a rule (e.g., stored) that may be executed when the event listener has been triggered and expunges that data from the document.

The system 400 may also include a security component 406 that may be configured to provide security functions for the document. According to an aspect, an entire database may be utilized to determine how users are interacting with the layers (e.g., the layers of FIG. 3) to provide recommendations. For example, whenever a nine-digit number is included there may be some security added by the security component 406 based on a determination that a non-digit number might be a social security number. In an example, when the document detects a nine-digit number has been provided, the security layer (e.g., the security component 406) may automatically mask the information to conform to business rules.

According to some implementations, the security functionality may change over time. For example, after xx amount of time, the access list is further restricted to a document. Security may apply to whole documents, content pieces within a document, workflow, audit, retention, or any other functionality. The security component 406 may be configured to interface with Human Resource systems to change role access based on current employee status. The system should track unauthorized attempts to access documents or make modifications without the user knowing. The security may be configured to operate as if it is allowing users to see a document and make changes, when in reality it has already redacted the sensitive portions of the documents. This may be utilized to discover what the unauthorized party is doing to see if they are truly hostile or not. The security may escalate unusual activity alerts to users based on history or based on actions performed on a larger scale to multiple documents. If someone tries to access a highly sensitive document, it may automatically put the document in lockdown mode, which requires an encryption key provided by an authority source to retrieve the content. Similarly, it might move the original document to a safer location and replace the file with a dummy placeholder document.

Figure 5:
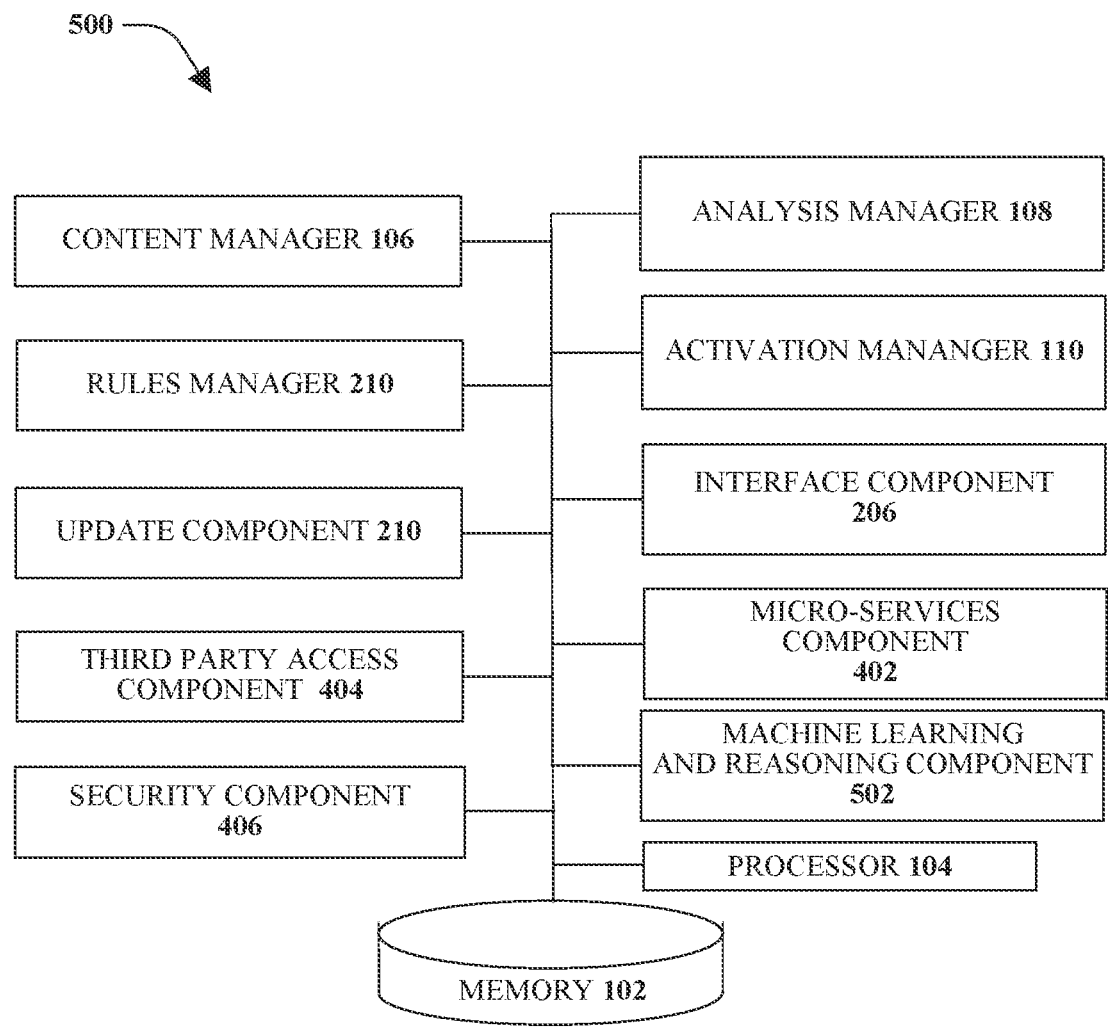
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with multilayered electronic content management in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer which sections of a document should be managed as discussed herein, where an action should be taken on one or more sections, and so on. Based on this knowledge, the machine learning and reasoning component 502 may make an inference based on a description of document content, trigger event, historical changes to a document, and so forth.

As used herein, the term "inference" refers generally to the process of reasoning about or inferring states of the system, a component, a module, the environment, and/or users (or devices associated with the users) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating dynamic content management) may employ various artificial intelligence-based schemes for carrying out various aspects thereof. For example, a process for determining when to dynamically alter a document, which portions of the document to update, whether to selectively ignore or bypass a dynamic document alteration, and so on may be enabled through an automatic classifier system and process.

A classifier is a function that maps an input attribute vector, $x=(x1, x2, x3, x4, xn$, to a confidence that the input belongs to a class. In other words, $f(x)=\text{confidence(class)}$. Such classification may employ a probabilistic and/or statistical-based analysis (e.g., factoring into the analysis utilities and costs) to prognose or infer an action that should be employed to determine if a section of a document is sensitive or confidential, whether a section of a document is subject to regulatory updates, whether a document has geographic restrictions, one or more actions to implement on a section, and so on. In the case of multilayered electronic content management, for example, attributes may be keywords or phrases and the classes may be identification of an identified issue that matches a trigger event.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which sections of a document should be dynamically altered, removed, added based on predefined rules and/or historical data related to the same or a similar content, and so forth. The criteria may include, but is not limited to, similar content, historical information, current information, event attributes, and so forth.

Additionally, or alternatively, an implementation scheme (e.g., a rule, a policy, and so on) may be applied to control and/or regulate which sections should be updated based on a third-party source. In some implementations, based upon a predefined criterion, the rules-based implementation may automatically and/or dynamically interpret attributes associated with each section. In response thereto, the rule-based implementation may automatically interpret and carry out functions associated with the content by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
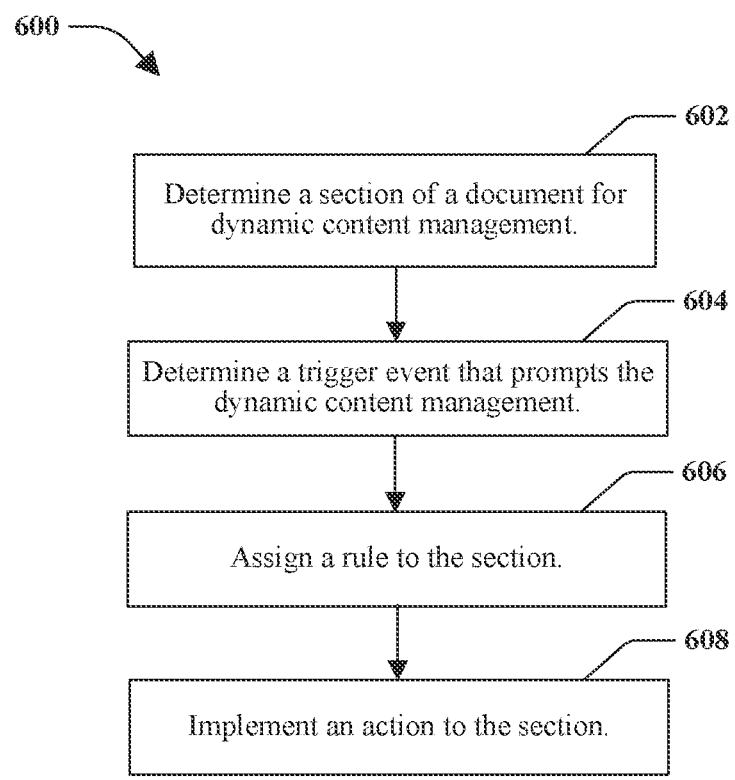
FIG. 6 illustrates an example, non-limiting method for multilayer content management, according to an aspect.

FIG. 6 illustrates an example, non-limiting method 600 for multilayer content management, according to an aspect. The method 600 in FIG. 6 may be implemented using, for example, any of the systems, such as the system 200 (of FIG. 2), described herein.

The method 600 starts at 602 when a section of a document for dynamic content management is determined. The section may be located anywhere within the document, including within any document layer. In addition, more than one section may be selected and/or subsections may be identified. For example, a user may provide input to identify the one or more sections of the document. In another example, the sections may be determined automatically based on various rules, policies, historical data, and so on.

At 604, a trigger event that prompts the dynamic content management is determined. The trigger event may be a predetermined time. In some implementations, the trigger event may be an activity performed external to the electronic document (e.g., a defined time/day, a change to a regulation, and so forth) and/or an activity performed internal to the electronic document (e.g., a security layer of the document implements security protocols). In an additional or alternative implementation, the trigger event may be a location of an access attempt (e.g., the user that is attempting to perceive the document is located in a restricted geographic area).

According to some implementations, at 606, a rule may be assigned to the section. The rule may be based on the trigger event. At 608, an action to the section of the document is implemented based on a determination that the trigger event has occurred and based on the rule assigned to the section. The rule and/or action may include deletion of the section, replacement of the section with another section, revision of the section, and so on.

Further, more than one rule may be assigned to a section, wherein implementation of one or more of the rules is a function of the trigger event. For example, a section may have a first rule that relates to an access location and a second rule that relates to unauthorized access. If the access location is prohibited but the user is authorized, the first rule applies but not the second rule (e.g., the document is not able to be opened). However, if the access location is allowed, but the user is unauthorized, the second rule applies and even though the document may be accessed, at least some sections of the document may be removed since the user is not authorized to perceive those sections.

Figure 7:
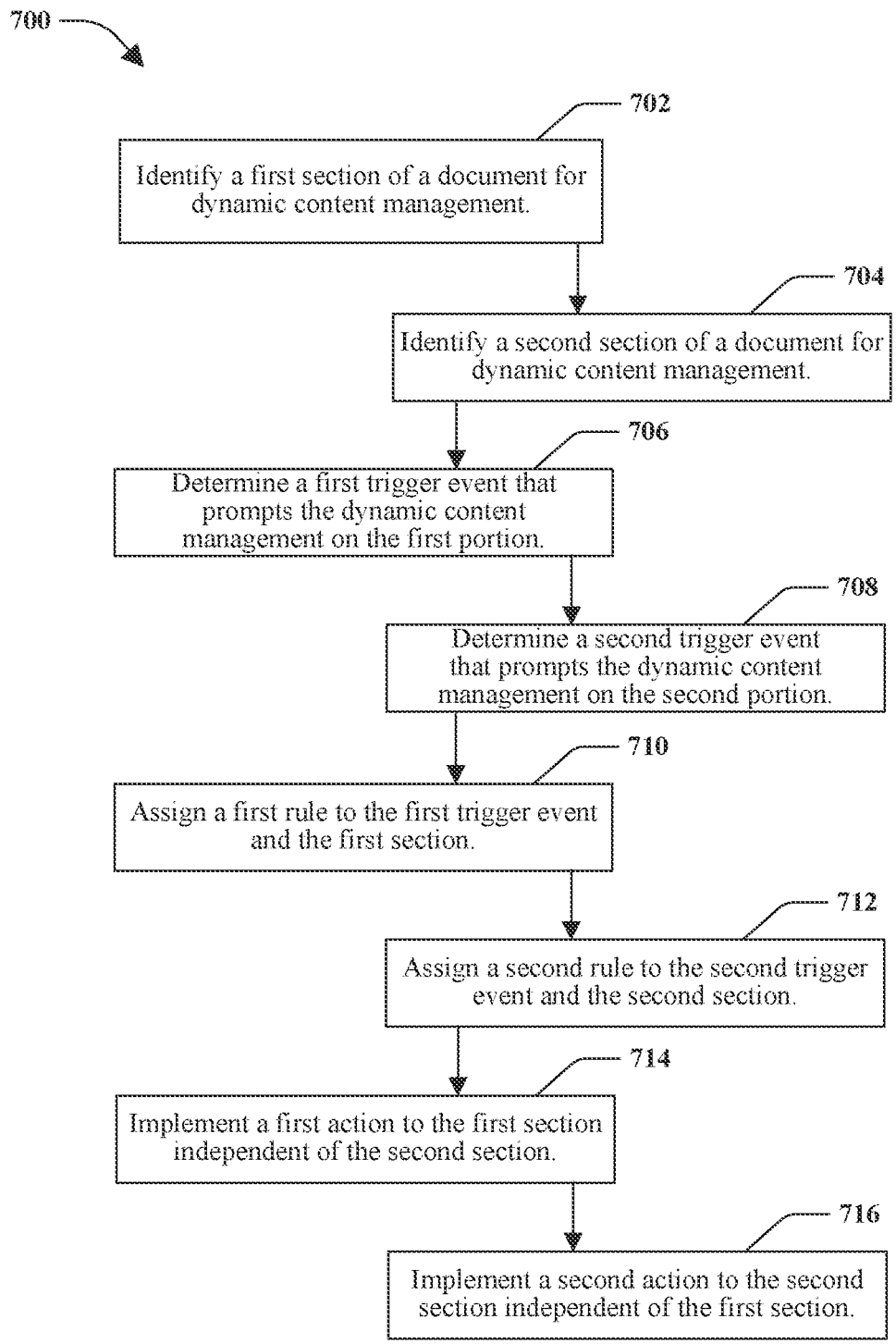
FIG. 7 illustrates an example, non-limiting method for dynamic content management, according to an aspect.

FIG. 7 illustrates an example, non-limiting method 700 for dynamic content management, according to an aspect. The method 700 in FIG. 7 may be implemented using, for example, any of the systems, such as the system 400 (of FIG. 4), described herein.

At 702, a first section of a document is identified for dynamic content management and, at 704, a second section of the document is identified for dynamic content management. According to an implementation, the first section and the second section are distinct portions of the document. However, according to other implementations, at least a portion of the first section and at least a portion of the second section comprise similar portions. For example, a portion of the first section and a portion of the second section may be the same portion of the document. In another aspect, the second section may be included in the first section (e.g., the second portion is a subsection of the first portion).

A first event that prompts the dynamic content management on the first portion is determined at 706. Further, a second event that prompts the dynamic content management on the second portion is determined at 708. According to some implementations, the first trigger event and the second trigger event may be similar trigger events. However, according to other implementations, the first trigger event and the second trigger event may be different trigger events.

At 708, a first rule is assigned to the combination of the first trigger event and the first section. Further, at 710, a second rule is assigned to the combination of the second trigger event and the second section. For example, the first section may be associated with two trigger events and different rules may be applied to the first section based on which trigger event has occurred.

Accordingly, at 712, a first action is implemented to the first section independent of the second section based on a determination that the first trigger event has been satisfied and based on the first rule. For example, if a trigger event associated with the second section does not occur, no action is taken on the second section.

Alternatively, or additionally, at 714, a second action is implemented to the second section independent of the first section based on a determination that the second trigger event has been satisfied and based on the second rule. For example, if a trigger event associated with the first section does not occur, no action is taken on the first section. However, if both the first trigger event and the second trigger event occur, action may be implemented on both the first section and the second section.

Figure 8:
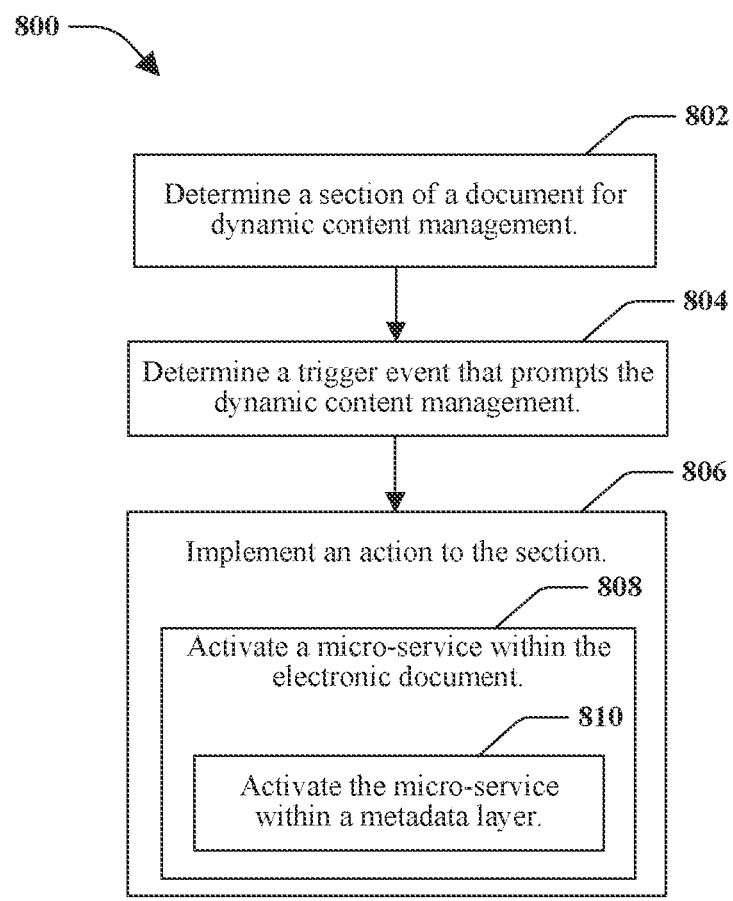
FIG. 8 illustrates an example, non-limiting method for dynamic content management, according to an aspect.

FIG. 8 illustrates an example, non-limiting method 800 for dynamic content management, according to an aspect. The method 800 in FIG. 8 may be implemented using, for example, any of the systems, such as the system 100 (of FIG. 1), described herein.

At 802, a section of a document for dynamic content management is determined. The determination may be made automatically based on predefined rules, policies, and/or historical information. Alternatively, or additionally, the determination may be made based on receipt of manual selection by a user, for example.

A trigger event that prompts the dynamic content management is determined, at 804. Similar to the section determination, the trigger event determination may be automatic or based on receipt of input. Further, the trigger event may be determined at substantially the same time as the section is determined.

The trigger event may be a predetermined time, an activity performed external to the electronic document, an activity performed internal to the electronic document, a location of access of the electronic document, or combinations thereof.

At 806, an action to the section of the document is implemented. The action may be implemented based on a determination that the trigger event has been satisfied and based on a rule assigned to the section. The rule may be self-contained within the electronic document. Implementing the action may include deleting the section, replacing the section with another section, editing the section, or combinations thereof.

According to an implementation, the implementation of the action may include activating a micro-service within the electronic document, at 808. Further activating the micro-service may include activating (or executing) the micro-service within a metadata layer of the electronic document, at 810.

Figure 9:
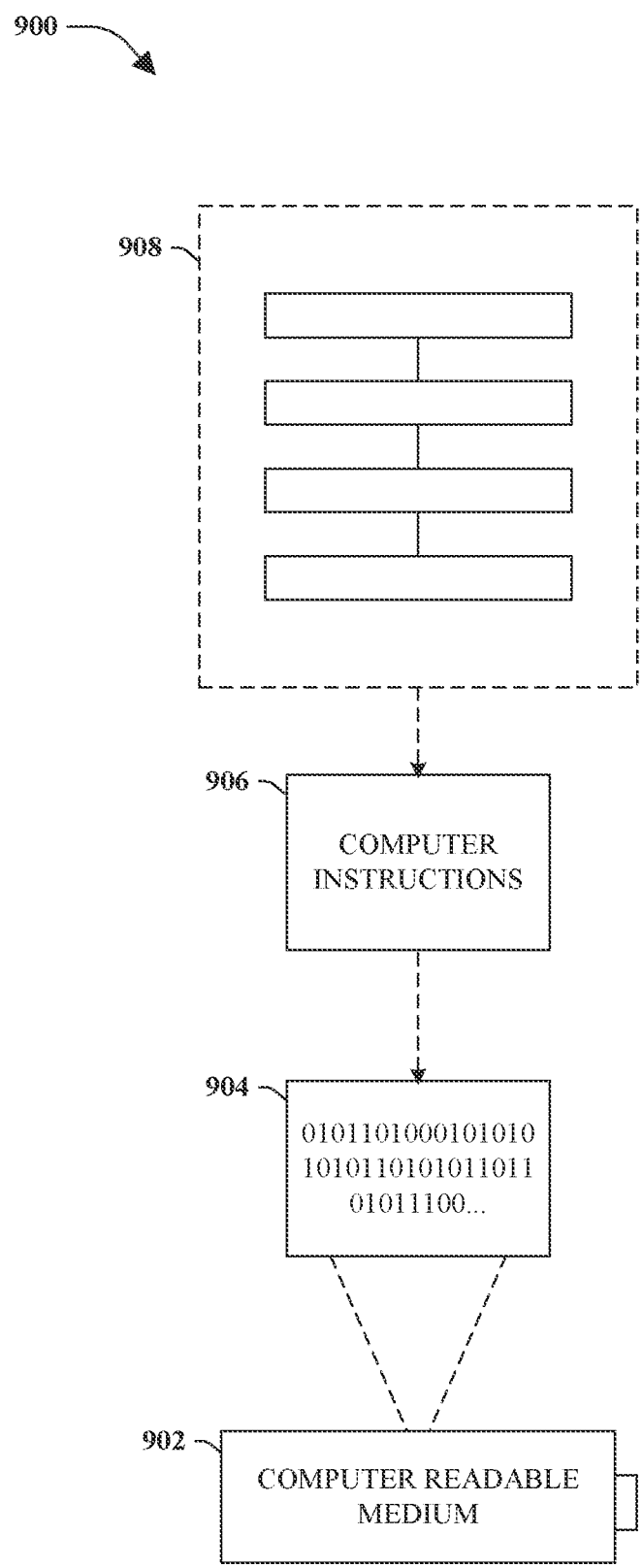
FIG. 9 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable multilayered electronic content management. An embodiment of a computer-readable medium or a computer-readable device devised in these ways is illustrated in FIG. 9, wherein an implementation 900 includes a computer-readable medium 902, such as a CD-R, DVD-R, flash drive, a platter of a hard disk drive, and so forth, on which is encoded computer-readable data 904. The computer-readable data 904, such as binary data including a plurality of zero's and one's as illustrated, in turn includes a set of computer instructions 906 configured to operate according to one or more of the principles set forth herein.

In the illustrated embodiment 900, the set of computer instructions 906 (e.g., processor-executable computer instructions) may be configured to perform a method 908, such as the method 600 of FIG. 6 and/or the method 700 of FIG. 7, for example. In another embodiment, the set of computer instructions 906 may be configured to implement a system, such as the system 200 of FIG. 2 and/or the system 400 of FIG. 4, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions is combined or distributed as desired in various environments.

Figure 10:
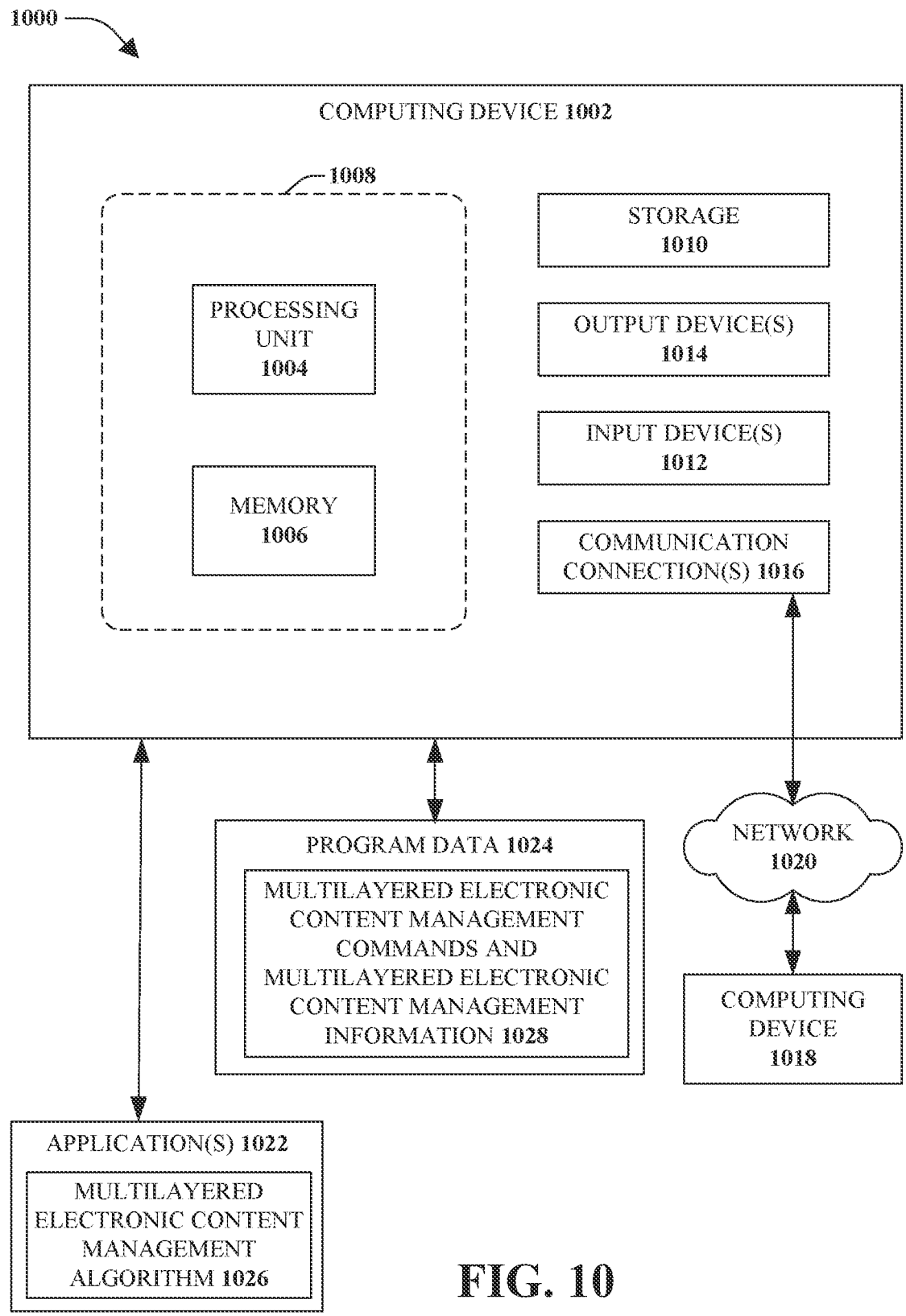
FIG. 10 illustrates an example, non-limiting computing environment where one or more of the aspects set forth herein are implemented, according to one or more aspects.

FIG. 10 illustrates a system 1000 that may include a computing device 1002 configured to implement one or more embodiments provided herein. In one configuration, the computing device 1002 may include at least one processing unit 1004 and at least one memory 1006. Depending on the exact configuration and type of computing device, the at least one memory 1006 may be volatile, such as RAM, non-volatile, such as ROM, flash memory, etc., or a combination thereof. This configuration is illustrated in FIG. 10 by dashed line 1008.

In other embodiments, the computing device 1002 may include additional features or functionality. For example, the computing device 1002 may include additional storage such as removable storage or non-removable storage, including, but not limited to, magnetic storage, optical storage, etc. Such additional storage is illustrated in FIG. 10 by storage 1010. In one or more embodiments, computer readable instructions to implement one or more embodiments provided herein are in the storage 1010. The storage 1010 may store other computer readable instructions to implement an operating system, an application program, etc. Computer readable instructions may be loaded in the at least one memory 1006 for execution by the at least one processing unit 1004, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1002 may include input device(s) 1012 such as keyboard, mouse, pen, voice input device, touch input device, infrared cameras, video input devices, or any other input device. Output device(s) 1014 such as one or more displays, speakers, printers, or any other output device may be included with the computing device 1002. The input device(s) 1012 and the output device(s) 1014 may be connected to the computing device 1002 via a wired connection, wireless connection, or any combination thereof. In one or more embodiments, an input device or an output device from another computing device may be used as the input device(s) 1012 and/or the output device(s) 1014 for the computing device 1002. Further, the computing device 1002 may include communication connection(s) 1016 to facilitate communications with one or more other devices, illustrated as a computing device 1018 coupled over a network 1020.

One or more applications 1022 and/or program data 1024 may be accessible by the computing device 1002. According to some implementations, the application(s) 1022 and/or program data 1024 are included, at least in part, in the computing device 1002. The application(s) 1022 may include a multilayered electronic content management algorithm 1026 that is arranged to perform the functions as described herein including those described with respect to the system 300 of FIG. 3. The program data 1024 may include multilayered electronic content management commands and multilayered electronic content management information 1028 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that stores instructions that, when executed by the processor, cause the processor to:
identify, via a machine-learning classifier, an association of a trigger condition with a section of a generated electronic document;
assign a content retention rule to the section based on the trigger condition, the content retention rule being stored in metadata of the document;
invoke a first micro-services component within the document, the first micro-services component being included within the document and configured to acquire data from outside the document;
identify, by a second micro-services component that is included within the document, the content retention rule that is stored in the metadata of the document;

evaluate the trigger condition of the content retention rule assigned to the section based on the data acquired from outside the document, the section identified by the metadata; and modify, by the second micro-services component, the section of the document when the trigger condition is satisfied in accordance with the content retention rule.

2. The system of claim 1, wherein the instructions further cause the processor to replace the modified section of the document with a new section of the document.

3. The system of claim 2, wherein the new section of the document is an update of the section.

4. The system of claim 1, wherein the instructions further cause the processor to:

evaluate a security condition of a security rule associated with a second section of the document; and trigger an action based on the security rule when the security condition is satisfied.

5. The system of claim 4, wherein the action is to remove or encrypt at least a portion of the second section of the document when the security condition is satisfied.

6. The system of claim 1, wherein the data acquired from outside the document comprises a current time and the trigger condition of the content retention rule is one or more predetermined times.

7. The system of claim 1, wherein the data acquired from outside the document is a current location and the trigger condition of the content retention rule is one or more predefined geographic locations.

8. The system of claim 1, wherein:

the metadata includes an identification of the section of the document, and the second micro-services component modifies the section of the document based on a correlation between the trigger condition, the content retention rule, and the identification that is included in the metadata.

9. The system of claim 1, the instructions further causing the processor to:

assign the content retention rule to a combination of the section of the document and the trigger condition, wherein the metadata is modified to include the content retention rule that is based on the trigger condition identified via the machine-learning classifier.

10. A method, comprising:

identifying an association of a trigger condition with a section of a generated electronic document;

assigning a content retention rule to the section based on the trigger condition, the content retention rule being stored in metadata of the document;

invoking a first micro-services component within the document, the first micro-services component being included within the document and configured to acquire data from outside the document;

identifying, by a second micro-services component that is included within the document, the content retention rule that is stored in the metadata of the document;

evaluating the trigger condition of the content retention rule assigned to the section based on the data acquired from outside the document, the section identified by the metadata; and modifying, by the second micro-services component, the section of the document when the trigger condition is satisfied in accordance with the content retention rule.

11. The method of claim 10, further comprising replacing the modified section of the document with a new section of the document.

12. The method of claim 11, further comprising replacing the modified section of the document with an update of the section as the new section of the document.

13. The method of claim 10, further comprising:

evaluating a security condition of a security rule associated with a second section of the document; and initiating an action based on the security rule when the security condition is satisfied.

14. The method of claim 13, further comprising initiating removal or encryption of at least a portion of the second section of the document when the security condition is satisfied.

15. The method of claim 10, further comprising invoking the first micro-services component to acquire a time as the data acquired from outside the document.

16. The method of claim 10, further comprising invoking the first micro-services component to acquire a location as the data acquired from outside the document.

17. A computer-readable storage medium that stores instructions that, when executed by a processor, cause the processor to perform operations, comprising:

identifying, via a machine-learning classifier, an association of a trigger condition with a section of a generated electronic document;

assigning a content retention rule to the section based on the trigger condition, the content retention rule being stored in metadata of the document;

activating a first micro-services component included within an electronic document, the first micro-services component being included within the document and configured to acquire data from outside the document;

identifying, by a second micro-services component that is included within the document, the content retention rule that is stored in the metadata of the document;

assessing the trigger condition of the content retention rule assigned to the section based on the data acquired from outside the document, the section identified by the metadata; and modifying, by the second micro-services component, the section of the document when the trigger condition is satisfied in accordance with the content retention rule.

18. The computer-readable storage medium of claim 17, the operations further comprising replacing the modified section of the document with a new section of the document.

19. The computer-readable storage medium of claim 17, the operations further comprising acquiring at least one of a current time or a geographic location from outside the document.

20. The computer-readable storage medium of claim 17, the operations further comprising:

detecting an unauthorized attempt to access the electronic document; and triggering an action based on a security rule associated with at least one section of the document in response to the unauthorized attempt.

* * * * *